Nov. 13, 1962     T. S. BRISKIN ETAL     3,063,610

AUTOMATIC THREADING MECHANISM FOR MOTION PICTURE PROJECTOR

Filed Dec. 4, 1959     2 Sheets-Sheet 1

Theodore S. Briskin
Robert L. Moore
Rudolph A. Rom
INVENTORS

BY
Ooms, McDougall, Williams & Hersh
Attorneys

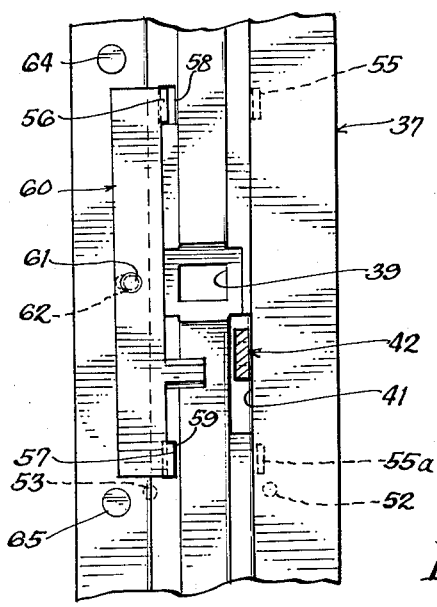
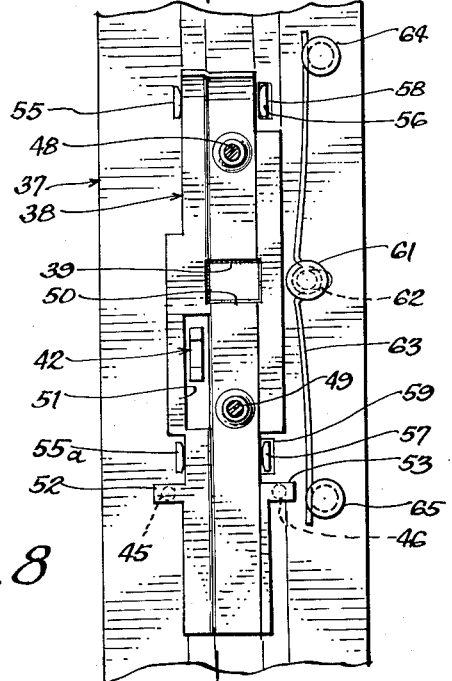
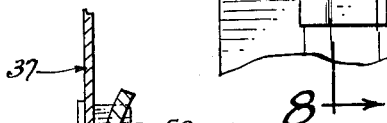
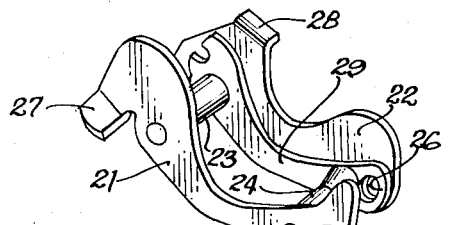
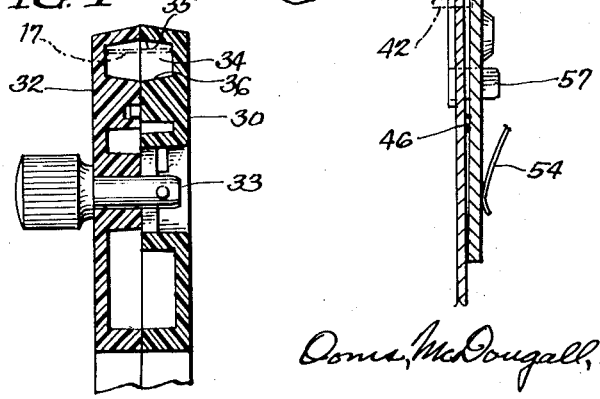

United States Patent Office 3,063,610
Patented Nov. 13, 1962

3,063,610
AUTOMATIC THREADING MECHANISM FOR MOTION PICTURE PROJECTOR
Theodore S. Briskin, Chicago, Robert L. Moore, La Grange Highlands, and Rudolph A. Rom, Berwyn, Ill., assignors, by mesne assignments, to Revere Camera Company, a corporation of Delaware
Filed Dec. 4, 1959, Ser. No. 857,307
2 Claims. (Cl. 226—91)

This invention relates to an improved automatic threading mechanism for a motion picture projector of the type customarily used in the home, in which the film is fed continuously from a take-off reel through a sprocket and guide system into a film gate, advanced intermittently through the film gate, and then guided around a second sprocket on to a take-up reel.

The principal problem encountered in providing such an automatic threading mechanism arises from the fact that the sprockets which feed the film into and withdraw it from the film gate rotate at a constant speed, whereas the claw or finger which moves the film through the film gate advances it in intermittent movements. Thus, it is essential that loops be formed in the film between each of the driving sprockets and the film gate, thereby providing enough slack to prevent binding or tearing of the film as it is moved through and away from the film gate. In the past, these loops have generally been formed manually by the projector operator, who has been required to unwind the leading edge of the film from the take-off reel and advance it through the film gate and on to the take-up reel, carefully forming the necessary loops between each of the driving sprockets and the film gate, before beginning operation of the projector.

It has, of course, long been recognized that it would be desirable to relieve the projector operator of the task of manually threading the film on to the take-up reel and forming the necessary loops therein, and a number of different automatic threading mechanisms have heretofore been proposed. None of these has, however, so far as applicants are aware, proved to be completely satisfactory, largely because of the difficulties encountered with the means provided for forming the film loops and for accommodating fluctuations in the size of such loops which occur from time to time in the showing of a single reel of film.

It is therefore, the principal object of this invention to provide a threading mechanism having means for automatically forming the necessary film loops, and requiring the projector operator to do nothing more than feed the leading edge of the film from the take-off reel on which it is carried to a sprocket positioned adjacent said reel, the film thereafter being automatically fed into and advanced through the film gate and on to the take-up reel.

It is a further object of the invention to provide such an automatic threading mechanism in which the means for forming the loops between each of the sprockets and the film gate are simple, compact and stationary, in contrast to the loop-forming means heretofore generally used, which have had to be moved from a closed to an open position during passage of the film therethrough.

A third object of this invention is the provision of an automatic threading mechanism having simple and compact means for accommodating increases in the size of either or both film loops at any time during the showing of a single film reel of film, said means being movable from a normally closed position to an open position only in the event the film loop in the loop-forming means situated adjacent thereto becomes too large to be accommodated by the loop-forming means, and remaining in the open position only so long as such enlarged loop condition persists.

Other objects and advantages of this invention will appear from the following specification, taken in conjunction with the accompanying drawings, in which:

FIG. 4 is a view of the back side of the mechanism shown in FIG. 3;

FIG. 5 is another view of the mechanism of FIG. 3, its cooperating pressure pad being shown in place in front thereof;

FIG. 6 is a top perspective view of the spring-loaded film guide means shown in FIGS. 1 and 2;

Figure 1:
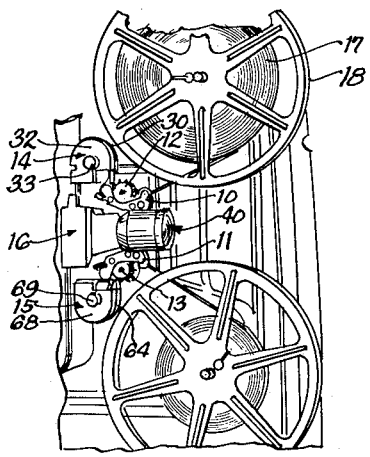
FIG. 1 is a view of a preferred embodiment of the automatic threading mechanism incorporating our invention, shown in association with the reels upon which the film is carried and that part of a motion picture projector upon which the automatic threading mechanism is mounted.
Figure 2:
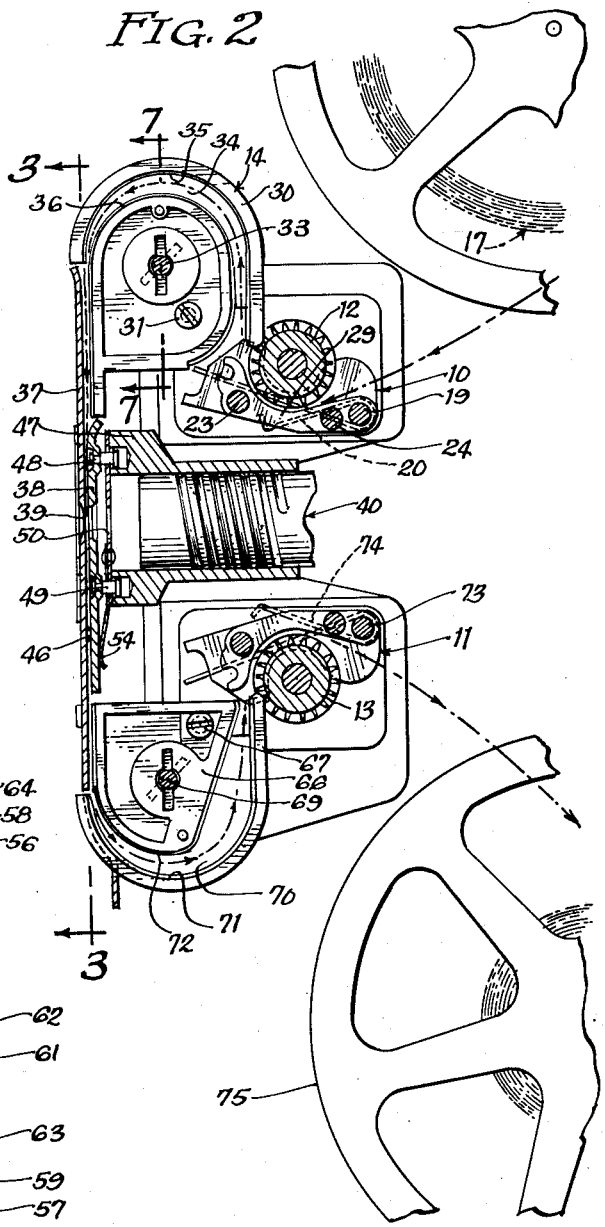
FIG. 2 is a sectional view of the automatic threading mechanism shown in FIG. 1, taken along the middle of the film path.

FIG. 7 is a cross-sectional view of the upper loop-forming guide shown in FIGS. 1 and 2, taken along the line 7—7; and FIG. 8 is an enlarged sectional view of a portion of the film gate assembly, taken along the line 8—8 of FIG. 5.

As shown in FIG. 1, the automatic threading mechanism embodying our invention consists essentially of a pair of spring-loaded film guides 10 and 11 pivotally mounted adjacent the projector's conventional toothed sprockets 12 and 13, a pair of stationary loop-forming guides 14 and 15, and a unique film gate assembly 16. With this mechanism, all that the projector operator is required to do is start the projector motor (not shown) by means of which sprockets 12 and 13 are driven, unwind the leading edge of the film 17 to be shown from the take-off reel 18 on which it is carried and feed it on to sprocket 12 which, like sprocket 13, rotates continuously at all times when the projector motor is operating. From this point on, as will appear from the detailed description which follows, operation of the threading mechanism is completely automatic.

Once the teeth of sprocket 12 have engaged the film 17 in the holes provided for that purpose, the film is automatically advanced into and through upper film guide 10, which is pivotally mounted on the projector frame adjacent sprocket 12 by conventional pivotal mounting means 19 but normally maintained in the position in which it is shown in the drawings by a lightly-loaded spring 20 (shown in dotted lines in FIG. 2). As best illustrated in FIG. 6, this film guide 10 consists of a front wall 21 and a rear wall 22, jointed by a pair of bolts 23 and 24 and provided with a pair of holes 25 and 26 to receive the pivotal mounting means 19 by which it is attached to the projector frame. The front wall 21 is also provided with a forwardly projecting ear 27 by which the operator may, if he so desires, manually override spring 20 and pivot the film guide 10 downwardly about its mounting means 19, to a point where a rearwardly projecting ear 28 on the rear wall 22 engages a cooperating limit stop (not shown) on the projector frame.

As the film 17 is fed into and advanced through film guide 10, the opposite edges of the film ride in a channel formed by plate 29 mounted on the rear wall 22 and a corresponding plate (not shown) mounted on the front wall 21. It will thus be obvious that the face of the film 17 does not contact bolts 23 or 24 as the film travels through film guide 10, and that the film will not be damaged or the images thereon distorted in the course of its passage through the film guide.

After the leading edge of the film 17 has passed through film guide 10, it enters the mouth of upper loop-forming guide 14, which consists of a rear section 30 mounted on the projector frame by a bolt 31 (FIG. 2) and a cover section 32 removably secured to the rear section 30 by conventional fastening means 33 (FIG. 1). As shown in FIG. 2, the film 17 travels through upper loop-forming guide 14 in a film channel 34 formed by its top wall 35 and a lower interior wall 36. To prevent the face of the film 17 from coming into contact with outer wall 35, which is the effective guide member as the film is advanced along the channel 34 of loop-forming guide 14, the wall 35 is formed with a slight upward pitch from each side toward its center, as is clearly shown in FIG. 7. This construction insures that only the edges of the film 17 will actually contact the surface of outer wall 35 as the film is guided through channel 34, and that the film will not be damaged or the images thereon distorted in the course of its passage through upper loop-forming guide 14. As also shown in FIG. 7, the lower interior wall 36 is similarly formed with a slight downward pitch from each side toward its center, for this same purpose.

As the leading edge of the film 17 emerges from the discharge end of loop-forming guide 14 and is fed into the mouth of the film gate assembly 16 shown in detail in FIGS. 3, 4, 5 and 8, it will be obvious that the film loop which is necessary to prevent binding or tearing of the film as it is intermittently moved through the film gate will already have been formed. It will also be obvious that the channel 34 in upper loop-forming guide 14 is sufficiently deep to accommodate minor fluctuations in the size of the loop, which may occur from time to time in the showing of a single reel of film.

The film gate assembly 16 into which the film 17 is fed as it emerges from the discharge end of upper loop-forming guide 14 consists of a stationary aperture plate 37 and a movable pressure pad 38. The aperture plate 37 is, of course, provided with a projection aperture 39 aligned with the aperture (not shown) in lens assembly 40 and an elongated film drive slot 41 (see FIG. 3) through which a conventional reciprocating claw 42 having a pair of fingers 43 and 44 engages the film 17 in the holes provided for that purpose; it also has a pair of raised bosses 45 and 46 located near its lower end, the height of which is preferably only a few thousandths of an inch less than the thickness of the film 17.

Pressure pad 38, which is movably mounted on lens holder 47 by a pair of studs 48 and 49 for cooperation with aperture plate 37, is also provided with a projection aperture 50 (see FIG. 5) and film drive slot 51, aligned with and corresponding to the opening 39 and film drive slot 41 in aperture plate 37, and with a pair of protruding arms 52 and 53, aligned with and adapted to engage the raised bosses 45 and 46 on aperture plate 37. A leaf spring 54, which is also mounted on lens holder 47, engages the lower end of pressure pad 38 and urges it toward aperture plate 37.

It will be obvious that, prior to the time when the leading edge of the film 17 is engaged by reciprocating claw 42, the effect of leaf spring 54 is to exert force on that portion of pressure pad 38 which extends below its protruding arms 52 and 53, causing the pressure pad 38 to rotate or pivot about the fulcrum formed at the point where arms 52 and 53 engage the raised bosses 45 and 46 on the aperture plate 37. The result is that, while the lower end of the pressure pad 38 is forced into contact with aperture plate 37, its upper end will be rotated or pivoted outward, as best shown in FIG. 8, to provide an opening larger than the thickness of the film 17, thus making it possible for the film 17 to advance freely to the point where it is engaged by the fingers 43 and 44 of reciprocating claw 42, at which point the claw 42 takes control of and advances the film in intermittent frame-by-frame movements through the lower portion of the film gate assembly.

As claw 42 advances the film 17 into the more constricted opening at the lower end of the film gate assembly 16, where pressure pad 38 is forced into contact with aperture plate 37 by leaf spring 54, the film 17, being of a thickness greater than the height of bosses 45 and 46, forces the lower end of pressure pad 38 to rotate or pivot away from aperture plate 37, with the result that the pressure pad 38 thereafter exerts pressure against the film 17 and aperture plate 37 throughout the pressure pad's full length. It will thus be apparent that, after the leading edge of the film 17 has passed the point where leaf spring 54 urges pressure pad 38 toward aperture plate 37, sprocket 12 serves only to fed the film 17 through upper film guide 10 and upper loop-forming guide 14 to the mouth of the film gate assembly 16, at which point reciprocating claw 42 takes control of and advances the film in intermittent frame-by-frame movements throughout the entire length of film gate assembly 16.

Figure 3:
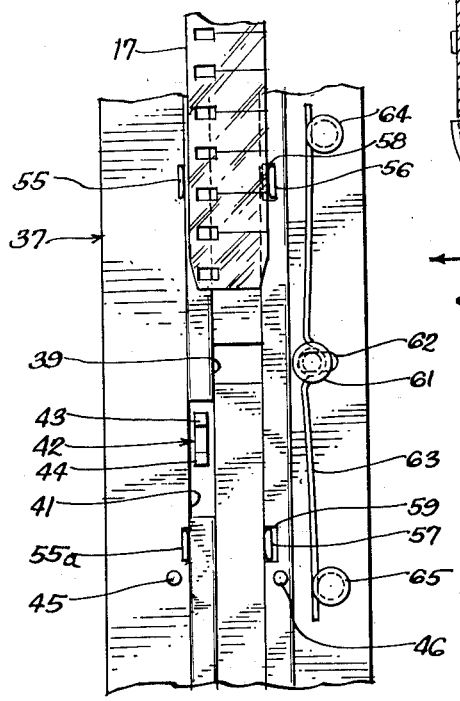
FIG. 3 is a view along the line 3—3 of FIG. 2, showing in detail the construction of the aperture plate and the means provided thereon for guiding the edges of the film through the film gate assembly.

Aperture plate 37 is also provided with means for positively engaging and guiding the edges of the film 17 as it advances through film gate assembly 16. As shown in FIG. 3, these means consist of a pair of fixed projections 55 and 55a which contact one side of the film 17, and a cooperating pair of projections 56 and 57 movably positioned in slots 58 and 59 respectively, which contact the opposite edge, all four projections having chamfered corners on their film-contact sides. The movable projections 56 and 57 are carried on the opposite ends of a plate 60 which is pivotally mounted behind the aperture plate 37 by means of a bolt 61, seated in an oversized hole 62 and normally urged toward the projection aperture 39 by a spring 63, the opposite ends of which are engaged by a pair of fixed bolts 64 and 65 rigidly mounted on the aperture plate 37.

As the film 17 enters the mouth of film gate assembly 16 and advances between aperture plate 37 and pressure pad 38, its leading edge comes into contact with both upper fixed projection 55 and upper movable projection 56. The pressure exerted by the film 17 on movable projection 56 will, of course, force projection 56 out of the film path toward spring 63 and, by virtue of the pivotal mounting of plate 60, cause the lower projection 57 to move in the opposite direction, i.e., into the path of the film 17. Almost immediately, however, when the leading edge of the film 17 has been engaged by reciprocating claw 42 and intermittently advanced into engagement with lower fixed projection 55a and lower movable projection 57, projection 57 will also be forced out of the film path, toward spring 63. Since plate 60 is at this point no longer free to pivot about bolt 61, due to the fact that the pressure exerted by the film is now urging both movable projections 56 and 57 in the direction of spring 63, the result is that the bolt 61 is itself forced to move in oversized hole 62 against spring 63. Spring 63 will, nevertheless, continue to exert a counter-force against bolt 61 and, through plate 60, cause the movable projections 56 and 57 to maintain a slight but constant pressure on the edge of the film which contacts them.

It will thus be apparent that the film gate assembly is provided with means which guide the film in two dimensions—i.e., the aperture plate 37 and cooperating pressure pad 38, between which the face of the film is guided, and the pairs of fixed and movable projections 55—57, which guide the edges of the film.

In the event the fingers 43 and 44 or reciprocating claw 42 should fail, on one or more succeeding occasions, to register with the holes provided in the film 17, or the film for any other reason should temporarily fail to advance into and through the film gate assembly 16, sprocket 12 will nevertheless continue to feed more film into upper loop-forming guide 14, thus enlarging the size of the film loop formed therein. Although channel 34 in loop-forming means 14 is sufficiently deep to accommodate minor fluctuations in the size of the film loop, other means are necessary to take care of more substantial changes in the size of the film loop. It is for this purpose that upper film guide 10 is provided with the light spring 20 (shown in dotted lines in FIG. 2), which normally maintains the film guide in the position in which it is shown in FIG. 2 but which, if sufficient pressure is exerted on it by the film backing up in loop-forming guide 14, will permit the film guide 10 to pivot downwardly about bolt 19 to a point where ear 28 contacts the cooperating limit stop member on the projector frame (not shown).

As will be readily apparent, when film guide 10 is in its "open" position, a substantial increase in the size of the upper film loop can be accommodated. The film guide 10 will, however, remain in the "open" position only so long as this enlarged loop condition persists, being returned to its normally "closed" position by the spring 20 when the upper film loop has been reduced to a size which can be accommodated solely by loop-forming guide 14 and the film 17 is no longer exerting sufficient pressure on film guide 10 to overcome the force of the spring 20.

As the film 17 emerges from the discharge end of the film gate assembly 16, it enters lower loop-forming guide 15 which, like upper loop-forming guide 14, consists of a rear section 66 rigidly mounted on the projector frame by a bolt 67 (FIG. 2) and a cover section 68 removably secured to the rear section 66 by conventional fastening means 69. Lower loop-forming guide 15 is also provided with a film channel 70, formed by an outer wall 71 and an interior wall 72 within which the film 17 travels. As in the case of upper loop-forming guide 14, the outer wall 71 of lower loop-forming guide 67 is formed with a slight upward pitch from each side toward its center, and the interior wall 72 is similarly formed with a slight downward pitch from each side toward its center, to insure that only the edges of the film 17 will actually contact the surface of either wall 71 or wall 72 as the film is guided through channel 70. When the film 17 emerges from the discharge end of lower loop-forming guide 15, the second essential film loop which serves to prevent binding or tearing of the film as it is picked up by driving sprocket 13 will thus have been formed.

As in the case of upper loop-forming guide 14, it will be apparent that the channel 70 in the lower loop-forming guide 15 is sufficiently deep to accommodate any minor fluctuations in the size of the lower film loop which may occur from time to time. Similarly, to accommodate more substantial changes in the size of the lower film loop, a lower film guide 11, identical in construction to upper film guide 10, is situated adjacent sprocket 13. This guide, which is pivotally mounted on the projector frame by conventional pivotal mounting means 73, is also provided with a light spring 74 (shown in dotted lines in FIG. 2) which normally maintains it in the closed position in which it is shown in FIG. 2 but which permits it to be moved into an open position in the event the size of the lower film loop increases to a point where it cannot be accommodated by the channel 70 in lower loop-forming guide 15. Again like upper film guide 10, lower film guide 11 will remain in the open position only so long as an enlarged loop condition exists, being returned to its normally closed position by the spring 74 when the size of the loop has been reduced to the point where it can be accommodated by lower loop-forming guide 15.

After the film 17 has been engaged by sprocket 13, it is automatically fed on to take-up reel 75. It will, of course, be apparent that, at any stage in the showing of a single reel of film prior to the time when the entire reel has been advanced past reciprocating claw 42, the direction of movement of the film can be reversed and the film rewound onto take-off reel 18 simply by reversing the projector motor (not shown), the threading mechanism heretofore described automatically feeding the film upward between the aperture plate 37 and pressure pad 38 through upper loop-forming guide 14 and upper film guide 10 around sprocket 12 and on to take-off reel 18.

There is thus provided an automatic threading mechanism in which the projector operator is required to do nothing more than feed the leading edge of the film from the take-off reel on which it is carried to the sprocket positioned adjacent thereto, and having means for automatically forming the necessary film loops between each of the sprockets and the film gate which are simple, compact and stationary, and do not have to be moved from a closed to an open position during passage of the film therethrough, as was generally true of the loop-forming guides employed on automatic threading mechanisms heretofore proposed. In this mechanism, temporary fluctuations in the size of either the upper or lower film loops which cannot be accommodated by the stationary loop-forming guides are provided for by having the film guides which cooperate with the loop-forming guides moved from a normally closed to open position, in which they remain only so long as the enlarged loop condition persists. The mechanism also provides positive, two-dimensional control of the film as it is fed through the film gate assembly.

It will, of course, be understood that the detailed description of the preferred embodiment of the invention shown in the accompanying drawings are illustrative only and that numerous changes therein and modifications thereof might be made by persons skilled in the art without departing from the substance of the invention. It is accordingly intended that the scope of the invention shall not be limited by the description and drawings but shall be determined primarily by references to the appended claims.

We claim:

1. An automatic film threading mechanism for a motion picture projector of the type having a projection aperture, means for intermittently advancing film past the projection aperture, means for continuously feeding film to said intermittent film-advancing means, and means for continuously removing film after it has been advanced past the projection aperture by said intermittent film-advancing means, comprising the combination of stationary loop-forming means having a film channel for receiving and guiding film through said means and forming film loops between said intermittent film-advancing means and each of said continuous film-feeding and continuous film-removal means, cooperating means adapted to be moved from a normally closed position adjacent said stationary loop-forming means to an open position to accommodate increases in the length of film between said intermittent film-advancing means and each of said continuous film-feeding and continuous film-removal means, and means urging said cooperating means to return to the closed position.

2. An automatic film threading mechanism for a motion picture projector of the type having a projection aperture, means for intermittently advancing film past the projection aperture, means for continuously feeding film to said intermittent film-advancing means, and means for continuously removing film after it has been advanced past the projection aperture by said intermittent film-advancing means, comprising the combination of a pair of stationary means for forming film loops between said intermittent film-advancing means and each of said continuous film-feeding and continuous film-removal means, each of said stationary loop-forming means having a film channel for receiving and guiding film through said means, cooperating means associated with each of said stationary loop-forming means adapted to be moved from a normally closed position to an open position to accommodate increases in the length of film between said intermittent film-advancing means and each of said continuous film-feeding and continuous film-removal means, and means urging each of said cooperating means to return to the closed position.

References Cited in the file of this patent

UNITED STATES PATENTS

| | | |
|---|---|---|
| 1,037,325 | Roebuck | Sept. 3, 1912 |
| 1,472,628 | Bonk | Oct. 30, 1923 |
| 1,939,238 | Stuber et al. | Dec. 12, 1933 |
| 1,987,406 | May | Jan. 8, 1935 |
| 1,997,409 | May | Apr. 9, 1935 |
| 2,114,608 | Ross | Apr. 19, 1938 |
| 2,228,092 | Sperry | Jan. 7, 1941 |
| 2,420,587 | Dietrich | May 13, 1947 |
| 2,497,847 | Coutant et al. | Feb. 21, 1950 |
| 2,703,034 | Thomas | Mar. 1, 1955 |
| 2,807,979 | Henriksen | Oct. 1, 1957 |